United States Patent [19]

Ballard et al.

[11] Patent Number: 4,548,737

[45] Date of Patent: Oct. 22, 1985

[54] CONDUCTING POLYMERS

[75] Inventors: Denis G. H. Ballard, Littleton; Kenneth T. Moran, Runcorn; Ian M. Shirley, Weaverham, all of England

[73] Assignee: Imperial Chemical Industries PLC, London, England

[21] Appl. No.: 597,389

[22] Filed: Apr. 6, 1984

[30] Foreign Application Priority Data

Apr. 6, 1983 [GB] United Kingdom ................. 8309362

[51] Int. Cl.$^4$ ............................................. H01B 1/00
[52] U.S. Cl. ..................... 252/500; 252/512; 252/518; 528/487; 528/488; 528/490; 528/491; 524/401; 524/439
[58] Field of Search ....................... 252/500, 512, 518; 528/487, 488, 490, 491; 526/308; 525/332.1, 331.9; 524/401, 80, 406–412, 418, 429, 438, 439

[56] References Cited

U.S. PATENT DOCUMENTS

| | | | |
|---|---|---|---|
| 4,344,869 | 8/1982 | Blinne et al. | 252/518 |
| 4,344,870 | 8/1982 | Blinne et al. | 252/518 |
| 4,375,427 | 3/1983 | Miller et al. | 252/512 |
| 4,440,669 | 3/1984 | Ivory et al. | 252/518 |
| 4,459,222 | 7/1984 | House | 252/500 |
| 4,476,296 | 10/1984 | Ballard et al. | 525/331.9 |
| 4,491,605 | 1/1985 | Mazurek et al. | 252/500 |
| 4,505,845 | 3/1985 | House | 252/500 |
| 4,505,846 | 3/1985 | House | 252/518 |
| 4,508,639 | 4/1985 | Camps et al. | 252/500 |

*Primary Examiner*—Josephine L. Barr
*Attorney, Agent, or Firm*—Cushman, Darby & Cushman

[57] ABSTRACT

An electrically conducting composition is described which comprises a polyarylene, e.g. polyphenylene, and a suitable doping agent, e.g. ferric chloride. The polyarylene is prepared from a poly(1,2-disubstitutedcyclohexa-3,5-diene).

4 Claims, No Drawings

CONDUCTING POLYMERS

This invention relates to the use of polyarylenes in electrical and electronic applications.

Electrically conducting compositions derived from polyphenylene are known.

We have now devised electrically conducting compositions which comprise certain polyarylenes described in our copending European patent application No. 82305028.1, the disclosure of which is incorporated herein by way of reference, and suitable doping agents.

By "electrically conducting composition" we mean a composition which has a direct current conductively of at least $10^{-5}$ ohm$^{-1}$ cm$^{-1}$ when measured by the four-probe method at room temperature.

By "four-probe method" we mean the known and accepted art method of measuring the electrical conductivity of a polymeric film or material using either A.C. or D.C. current between four contacts as described in, for example, Journal of the American Chemical Society 1978, 100, pages 1014–1016.

According to a first aspect of the present invention there is provided an electrically conducting composition comprising a polyarylene prepared from a poly(1,2-disubstituted-cyclohexa-3,5-diene) and a suitable doping agent.

According to a second aspect of the present invention there is provided a process for the preparation of an electrically conducting composition which process comprises (A) the steps of doping a poly(1,2-disubstituted-cyclohexa-3,5-diene) with a suitable doping agent and then converting the polycyclohexadiene into a polyarylene or, preferably (B) the steps of converting a poly (1,2-disubstituted-cyclohexa-3,5-diene) into a polyarylene and then doping the polyarylene with a suitable doping agent.

Arylene homo- or co-polymers of which electrically conducting compositions according to the first aspect of the present invention are comprised preferably have structures represented by the general formula

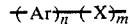

wherein the residues Ar and X, where X is present, may vary from unit to unit in the polymer chain, Ar represents a divalent aromatic or substituted aromatic group, X is a residue of one or more polymerisable comonomers as hereinafter defined, n and m are whole numbers and the ratio of the n:m lies in the range 1:0 to 1:100.

The 1,2-disubstituted-cyclohexa-3,5-diene homo- or co-polymer used in the process according to the second aspect of the present invention preferably has a structure represented by the general formula

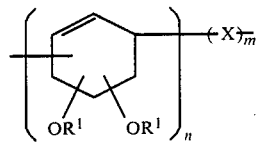

wherein the cyclohexenylene ring and the residue X, where X is present, may vary from unit to unit along the polymer chain; each R', which may be the same or different, is hydrogen, hydrocarbyl, e.g. lower alkyl having up to five carbon atoms, aroyl, alkanoyl having up to ten carbon atoms, or preferably R$^2$OCO, where R$^2$ is aryl or an alkyl group having up to ten carbon atoms, preferably one or two carbon atoms; X, n and m have the meanings hereinbefore ascribed to them.

By "polymerisable comonomer" we mean a compound which can be reacted under polymerisation conditions with a 1,2-disubstituted-cyclohexa-3,5-diene which has 1,2-substituents as herein defined to form a copolymer therewith.

Examples of suitable polymerisable comonomers the residues of which may be present in copolymers of general formula I or II include inter alia vinyl monomers, for example, olefinic hydrocarbons, e.g. styrene, methacrylates, vinyl halides, vinyl esters, acrylonitrile and tetrafluoroethylene; and compounds such as sulphur dioxide.

In polymers of general formula I, Ar is preferably a phenylene ring. The linkages by which the phenylene rings are bonded in the polymer backbones may be ortho or para to each other, and it is often preferred that a majority of the linkages are para.

In polymers of general formula II, the polymer backbone preferably comprises both cyclic ring

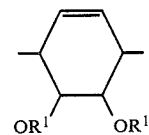

and cyclic ring.

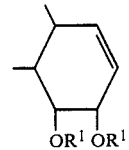

The 1,2-substituents in the poly(1,2-disubstituted-cyclohexa-3,5-diene) which are used in the process of the second aspect of the present invention are conveniently cis to each other since such polymers may be derived from cis-1,2-dihydroxycyclohexa-3,5-dienes which may be readily prepared by bio-chemical processes as is more fully described in our European patent application Publication No. 76606A. However, we do not exclude the possibility that the aforesaid substituents may be trans to each other, since such systems may be readily converted into polyarylenes as shown in our European patent application No. 82305028.1.

As additional, non-preferred, examples of the aforesaid 1,2-substituents may be mentioned inter alia amide, halide, thioester, urethane and xanthate.

By "suitable doping agent" we mean electron donor or acceptor materials, or mixtures thereof, which are known to be useful in increasing the conductivity of organic materials.

As examples of suitable doping agents of which electrically conducting compositions according to the present invention may be comprised may be mentioned inter alia electron donor agents such as Group IA metals, e.g. lithium, sodium, potassium and Group IA metal arenes, e.g. sodium and potassium naphthalene and sodium and potassium biphenyl; and electron acceptor agents such as Bronsted acids, e.g. HClO$_4$; non-metal oxides, e.g. SO$_3$ and N$_2$O$_5$, Group VB sulphides, e.g. Sb$_2$S$_5$, halides of Groups VB, VIA, IB, IIIB, IVB and the inert gases, e.g. $SbCl_5$, $SbF_3Cl_2$, $AsF_5$, $PF_5$, $CrO_2Cl_2$, $CrO_2F_2$, $FeCl_3$, $MoCl_5$, $CuCl_2$, $BCl_3$, $SnCl_4$, and $XeF_4$.

All references to the Periodic Table are to the Periodic Table of Elements in "Advanced Inorganic Chemistry" Third Edition, 1972, by Cotton and Wilkinson, Interscience.

The type of doping agent chosen depends upon the electronic characteristics desired in the electrically conducting composition of the present invention. Electron donor materials provide an n-type electrically conducting composition of the present invention. Electron acceptor materials provide a p-type electrically conducting composition (hole conductivity).

The interface between electron donor-doped and acceptor-doped compositions provides an n-p junction which can serve, for example, as a rectifier.

The concentration of doping agent in the electrically conducting compositions of the present invention is from about $10^{-5}$ to 0.5 mole per mole of arylene unit in the polyarylene, and preferably $10^{-3}$ to 0.1.

The poly(1,2-disubstituted-cyclohexa-3,5-dienes) used in the process of the present invention may be prepared as described in our aforesaid European patent application No. 82305028.1.

The conversion of a poly(1,2-disubstituted-cyclohexa-3,5-diene), either doped or undoped, into a polyarylene in the process according to the present invention may be carried out as described in our aforesaid European patent application No. 82305028.1 or preferably in the presence of an organic amine, particularly preferably an alkylamine in which the alkyl group has up to ten carbon atoms, more particularly preferably a tertiary alkylamine, e.g. tri-n-octylamine, as described in our European patent application No. 83305174.1, the disclosure in which is incorporated herein by way of reference.

In the process according to the present invention procedure B is preferred since the products thereof have higher electrical conductivities than the product of procedure A.

In the process according to the present invention the doping step may be carried out by any of the processes known in the electronics art for doping polymers with suitable dopants. As examples of such processes may be mentioned inter alia addition of the doping agent from the gas phase, mixing of doping agent and polyarylenes in the solid or melt phase, or preferably deposition of the doping agent from solution or electrochemically.

Where, in the process according to the present invention, the polyarylene is treated with a solution of a suitable doping agent the solvent therefor is preferably a polar aprotic solvent (a) in which the doping agent can be dissolved to form a concentrated solution and (b) to which the polyarylene is substantially inert, e.g. it is essentially insoluble therein. As examples of suitable solvents may be mentioned inter alia dioxan, diglyme, N,N-dimethylformamide and preferably nitromethane. The concentration of the aforesaid solution is typically between 5% w/w and 10% w/w.

Where, in the process according to the present invention, the polyarylene is treated with a solution of suitable doping agent treatment is typically carried out for between a few minutes and tens of hours, and conveniently is carried out at ambient temperature.

The polymers used in the process according to the present invention and electrically conducting compositions according to the present invention may be in a variety of forms. For example, they may be particulate, fibrous, in the form of a three-dimensional solid or preferably in the form of a substantially continuous two-dimensional solid, e.g. a film or coating.

Where the electrically conducting composition according to the present invention is a substantially continuous two-dimensional solid it may be in the form of a self-supporting layer, e.g. a film, typically having a thickness between 10 and 200 microns, or a coating or encapsulating layer, typically having a thickness of up to a few microns, on a suitable substrate, e.g. glass or a metal.

By the process of the present invention, particularly procedure B, continuous films and coatings of electrically conducting compositions comprising a polyarylene and a suitable dopant which have a greater surface area than hitherto known films and coatings of electrically conducting polyphenylene compositions can often be prepared.

The present invention is further illustrated with reference to the following examples.

EXAMPLES 1-3

A solution of poly(cis-1,2-dipivaloxycyclohexa-3,5-diene) (7.5 grams), prepared as described in Example 34 of European patent Publication No. 76605, in squalane (500 ml) was heated under nitrogen at reflux for 6 hours. An increasing quantity of a pale yellow precipitate was produced over the duration of the experiment. The mixture was cooled, filtered, washed with pentane and dried to leave polyphenylene powder.

Samples (200 mgs) of the polyphenylene powder were treated with clear portions (15 mls) of a solution, obtained by dissolving ferric chloride (5 grams) in nitromethane (80 mls) and allowing the mixture to stand overnight, in a nitrogen atmosphere for defined periods of time; within a couple of minutes the polyphenylene turned black. The products were filtered off, washed with nitromethane, dried under vacumn, and their chemical compositions determined.

The products were separately pressed into discs (15 mm diameter, 1 mm thick) and the electrical conductivity thereof was measured using a conventional 4-point probe technique. The results are given in Table 1.

TABLE 1

| Example No | Reaction Time | Conductivity ($ohm^{-1} cm^{-1}$) | Empirical Formula |
|---|---|---|---|
| 1 | 2 mins | $0.12 \times 10^{-2}$ | $[C_6H_{4.46}(FeCl_{4.05})0.070]_x$ |
| 2 | 3 hrs | $1.1 \times 10^{-2}$ | $[C_6H_{4.7}(FeCl_{4.1})0.078]_x$ |
| 3 | 20 hrs | $1.5 \times 10^{-2}$ | $[C_6H_{4.2}(FeCl_4)0.102]_x$ |

EXAMPLE 4

A solution of poly(bis-methylcarbonate of cis-1,2-dihydroxycyclohexa-3,5-diene) (5 grams), and tri-n-octylamine (300 microliters) in 1,4-dioxan (30 mls) was spin coated onto a glass microscope slide at 3000 rpm to give a colourless coating.

The coated slide was placed in an oven in a nitrogen atmosphere and the temperature was raised continuously over 1 hour to 410° C. to produce a coating, 1.2 microns thick, of polyphenylene.

The microscope slide coated with polyphenylene was immersed in the ferric chloride solution described in Example 1 to 3 hours, it was then washed with quantities of nitromethane until no yellow colour was extracted from the coating. The slide was dried and the conductivity of the coating was found to be $10^{-3}$ to $10^{-4}$ ohm$^{-1}$ cm$^{-1}$ (determined using a four terminal procedure in a nitrogen atmosphere.) In the four terminal procedure, one Keithly 610 electrometer was used to measure voltage and a second Keithly 610 electrometer was used to measure current; the electrodes comprised four parallel silver wires attached to the coating with silver paint.

EXAMPLE 5

This Example describes the preparation of an electrically conducting polyphenylene composition by an electrochemical process in a nitrogen atmosphere.

In an electrochemical cell, the working electrode was a substantially colourless film of polyphenylene on a platinum coated glass slide measuring 1 cm×2 cm (prepared as described in Example 4); the counter electrode was a thin platinum coil; the reference electrode was a silver wire; and the electrolyte was a 0.1 molar solution of lithium hexafluoroarsenate in propylene carbonate (distilled, dried over a molecular sieve and deoxygenated).

Current-potential curves indicated two anodic peaks, the first at +1.5 v and the second at +2.0 v versus the silver electrode, indicating the presence of oxidised polyphenylene with hexafluorarsenate anion acting as counterion. The colour of the polyphenylene film became dark brown to black.

We claim:

1. An electrically conducting composition comprising:
(a) a polyarylene of structure

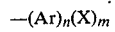

wherein
the residues Ar and X, where X is present, may vary from unit to unit in the polymer chain, Ar represents a divalent aromatic or substituted aromatic group,
X is a residue of one or more polymerisable comonomers selected from the group consisting of styrene, methacrylates, vinyl halides, vinyl esters, acrylonitrile, tetrafluoroethylene, and sulphur dioxide, n and m are whole numbers and the ratio of n:m lies in the range of 1:0 to 1:100, which polyarylene is prepared from a poly(1,2-disubstituted cyclohexa-3,5-diene) of structure

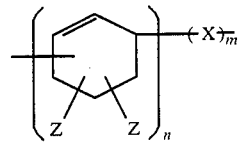

wherein
the cyclohexenylene ring and the residue X, where X is present, may vary from unit to unit along the polymer chain,
each z, which may be the same or different, is amide, halide, thioester, urethane, xanthate, or OR$^1$, where R$^1$ is hydrogen, lower alkyl having up to five carbon atoms, aroyl, alkanoyl having up to ten carbon atoms or R$^2$OCO where R$^2$ is aryl or alkyl having up to ten carbon atoms, X, n and m have the meanings above-ascribed to them; and
(b) a suitable doping agent selected from the group consisting of Group IA metals, Group IA metal arenes, Bronsted acids, non-metal oxides, Group VB sulphides, and halides of Groups VB, VIA, IB, IIB, IVB and the inert gases.

2. A composition as claimed in claim 1 wherein Ar is phenylene.

3. A composition as claimed in claim 2 wherein m is 0.

4. A composition as claimed in claim 1 in the form of a substantially continuous two dimensional solid.

* * * * *